United States Patent …

(12) United States Patent
Kesaraju et al.

(10) Patent No.: US 11,592,548 B2
(45) Date of Patent: Feb. 28, 2023

(54) METHODS AND APPARATUS TO IMPROVE DOPPLER VELOCITY ESTIMATION

(71) Applicant: Intel Corporation, Santa Clara, CA (US)

(72) Inventors: Saiveena Kesaraju, Hillsboro, OR (US); Arnaud Amadjikpe, Beaverton, OR (US); Chulong Chen, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 16/586,420

(22) Filed: Sep. 27, 2019

(65) Prior Publication Data

US 2020/0025906 A1    Jan. 23, 2020

(51) Int. Cl.
*G01S 13/58* (2006.01)
*H04B 7/04* (2017.01)
(Continued)

(52) U.S. Cl.
CPC .......... *G01S 13/589* (2013.01); *G01S 13/581* (2013.01); *G01S 13/64* (2013.01); *H04B 7/0413* (2013.01)

(58) Field of Classification Search
CPC ...... G01S 13/343; G01S 13/931; G01S 7/356; G01S 17/931; G01S 13/584;
(Continued)

(56) References Cited

U.S. PATENT DOCUMENTS 9,541,638 B2 * 1/2017 Jansen .................. G01S 13/878
2009/0237292 A1 * 9/2009 Tigrek .................... G01S 13/28
342/109
(Continued)

FOREIGN PATENT DOCUMENTS

CN    103257344 A  *  8/2013
CN    112088317 A  * 12/2020  .......... G01S 13/343
(Continued)

OTHER PUBLICATIONS

William Roberts, Petre Stoica, Jian Li*, Tarik Yardibi, and Firooz A. Sadjadi; Iterative Adaptive Approaches to MIMO Radar Imaging; 2010; IEEE Journal of Selected Topics in Signal Processing, vol. 4, No. 1, Feb. 2010 (Year: 2010).*
(Continued)

*Primary Examiner* — Erin F Heard
*Assistant Examiner* — Juliana Cross
(74) *Attorney, Agent, or Firm* — Hanley, Flight & Zimmerman, LLC

(57) ABSTRACT

Methods, apparatus, systems and articles of manufacture are disclosed to improve Doppler velocity estimation. An example apparatus is disclosed including a transmitter to transmit a first sweep signal at a first position in a first block of time during a transmit time sequence pattern, and transmit a second sweep signal at a second position in a second block of time during the transmit time sequence pattern, the second position different than the first position. The example apparatus also includes a velocity analyzer to determine a velocity and a direction of arrival of a target object identified during the transmit time sequence pattern.

25 Claims, 9 Drawing Sheets

(51) Int. Cl.
*G01S 13/64* (2006.01)
*H04B 7/0413* (2017.01)

(58) Field of Classification Search
CPC ........ G01S 13/582; G01S 17/26; G01S 17/58; G01S 15/8979; G01S 13/589; G01S 11/10; G01S 13/92; G01S 13/581; G01S 13/64; G01S 13/42; G01S 13/02; G01S 7/418; G01S 13/58; H04B 7/0413
See application file for complete search history.

(56) References Cited

U.S. PATENT DOCUMENTS

| | | | |
|---|---|---|---|
| 2016/0268693 A1* | 9/2016 | Ding | H01Q 21/0075 |
| 2018/0011170 A1* | 1/2018 | Rao | G01S 13/42 |
| 2019/0120953 A1* | 4/2019 | Takayama | G01S 13/93 |
| 2019/0212438 A1* | 7/2019 | Kim | G01S 7/411 |
| 2019/0324136 A1* | 10/2019 | Amadjikpe | G01S 13/931 |
| 2019/0346544 A1* | 11/2019 | Hammes | G01S 13/878 |
| 2020/0011968 A1* | 1/2020 | Hammes | G01S 13/52 |
| 2020/0132805 A1* | 4/2020 | Lehne | G01S 7/038 |
| 2020/0137884 A1* | 4/2020 | Markish | G01S 7/028 |
| 2020/0225314 A1* | 7/2020 | Amadjikpe | H05K 1/0219 |
| 2020/0225317 A1* | 7/2020 | Chen | G01S 13/584 |
| 2020/0233076 A1* | 7/2020 | Chen | G01S 7/4865 |
| 2020/0264274 A1* | 8/2020 | Zeng | G01S 7/354 |
| 2020/0309939 A1* | 10/2020 | Subburaj | G01S 13/584 |
| 2021/0026003 A1* | 1/2021 | Panzer | G01S 7/415 |
| 2021/0033691 A1* | 2/2021 | Solodky | H04B 7/0413 |
| 2021/0072367 A1* | 3/2021 | Solodky | G01S 7/0232 |
| 2021/0126661 A1* | 4/2021 | Galeev | H04B 1/525 |
| 2021/0318414 A1* | 10/2021 | Lesi | G01S 7/2923 |
| 2021/0325508 A1* | 10/2021 | Wang | G01S 7/414 |
| 2021/0333386 A1* | 10/2021 | Park | G01S 13/584 |

FOREIGN PATENT DOCUMENTS

| | | | |
|---|---|---|---|
| DE | 102019126352 A1 * | 4/2021 | |
| WO | WO-2011013989 A2 * | 2/2011 | H04B 1/76 |
| WO | WO-2018069120 A1 * | 4/2018 | G01S 13/343 |
| WO | WO-2018158353 A1 * | 9/2018 | G01S 13/003 |
| WO | WO-2020212569 A1 * | 10/2020 | |
| WO | WO-2021152208 A1 * | 8/2021 | |

OTHER PUBLICATIONS

Petre Stoica, Jian Li, Hao He; Spectral Analysis of Nonuniformly Sampled Data: A New Approach Versus the Periodogram; 2009; IEEE Transactions on Signal Processing, vol. 57, No. 3, Mar. 2009 (Year: 2009).*
Chen et al., "A Joint Doppler Frequency Shift and DOA Estimation Algorithm Based on Sparse Representations for Colocated TDM-MIMO Radar," Hindawi Publishing Corporation, Journal of Applied Mathematics, vol. 2014, Article ID 421391, 2014, 9 pages.
Rambach et al., "Optimal Time Division Multiplexing Schemes for DOA Estimation of a Moving Target Using a Colocated MIMO Radar," IEEE International Symposium on Signal Processing and Information Technology (ISSPIT), 2014, 6 pages.
Forsythe et al. "MIMO Radar: Concepts, Performance Enhancements and Applications," Mimo Radar Signal Processing, Chapter 2, pp. 65-121, John Wiley & Sons, 2008, 57 pages.
Eyer et al., "Variable Stars: Which Nyquist Frequency," Astronomy & Astrophysics Supplement Series, 135, 1-3, 1999, 3 pages.
Stoica et al., "Spectral Analysis of Nonuniformly Sampled Data: A New Approach Versus the Periodogram," IEEE Transactions on Signal Processing, vol. 57, No. 3, pp. 843-858, Mar. 2009, 16 pages.
Babu et al., "Spectral Analysis of Nonuniformly Sampled Data—a Review," Digital Signal Processing, vol. 20, pp. 359-378, 2010, 20 pages.

* cited by examiner

METHODS AND APPARATUS TO IMPROVE DOPPLER VELOCITY ESTIMATION

FIELD OF THE DISCLOSURE

This disclosure relates generally to radar systems, and, more particularly, to methods and apparatus to improve Doppler velocity estimation.

BACKGROUND

In recent years, autonomous and semi-autonomous vehicle technology has been implemented in more and more vehicles. An important component of this technology is the radar system that helps detect and track objects around the vehicle. One example system is a Multiple-input multiple-output (MIMO) radar system, which includes multiple transmitters that transmit radar signals that are subsequently detected by multiple receivers after being reflected by objects within range of the radar system. The signals transmitted by the different transmitters in a MIMO radar system are designed to be mutually orthogonal and uniformly slow-time sampled so that, when the signals are detected by the receivers, the signals can be uniquely identified to estimate the location and velocity of the objects.

BRIEF DESCRIPTION OF THE DRAWINGS

The figures are not to scale. In general, the same reference numbers will be used throughout the drawing(s) and accompanying written description to refer to the same or like parts.

Figure 1A:
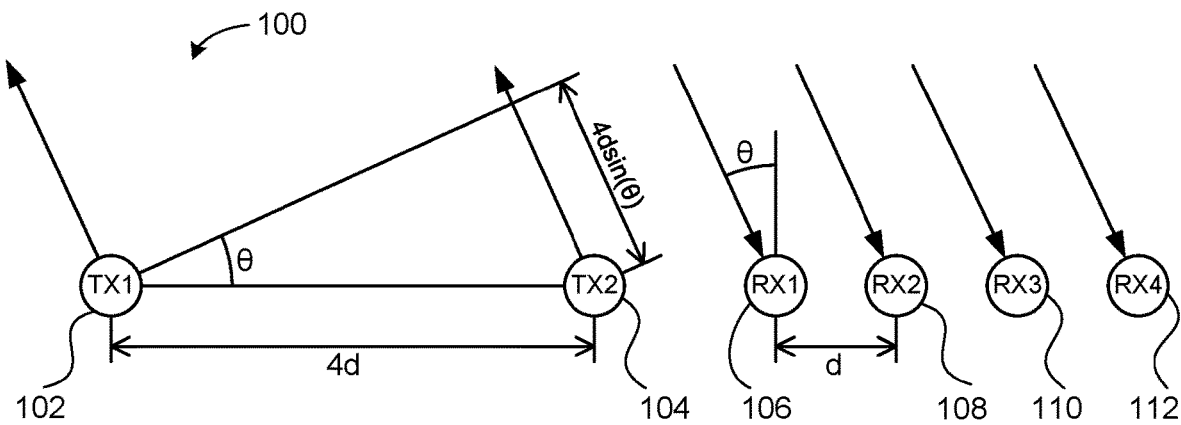
FIG. 1A illustrates an example antenna array for a MIMO radar system.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Radar systems are used on many vehicles to assist with navigation and collision avoidance. Radar systems are especially important in self-driving (autonomous) vehicles (e.g., self-driving cars). Radar systems are also used on semi-autonomous vehicles to perform driver assist functions, such as lane departure detection, blind spot monitoring, emergency braking, adaptive cruise control, etc. Radar systems not only detect targets in the surrounding area of the vehicle, but radar systems measure range, velocity, and bearing (direction of arrival) of targets. This information is used to help safely operate the vehicle. Radar systems typically include one or more radar sensors having one or more transmitter antennas and one or more receiver antennas. Radar sensors may be disposed on the sides of a vehicle to detect targets in different directions.

In general, the type of driving scenario (e.g., lane change assist, autonomous emergency braking, blind spot monitoring) determines the field of view requirements (or angular coverage) and/or detection range requirements from the radar sensor. One type of radar technique is multi-input multi-output (MIMO) radar beamforming. A MIMO radar forms a large virtual array from a much smaller subset of physical antenna elements. A MIMO radar uses N transmitters and M receivers to synthesize an N*M array of virtual elements, where N and M are natural numbers. These virtual elements are digitally processed (also known as digital beamforming (DBF)) to achieve high angular resolution with a smaller number (N+M) of physical elements than other radar systems.

Additionally, in a MIMO radar system, the transmissions from different transmit antennas (referred to herein as transmitters) are separable or distinguishable at receive antennas (referred to herein as receivers). The separability (e.g., distinguishability) of transmissions from different transmitters is typically achieved by making the different transmissions linearly orthogonal to one another. Two signals are linearly orthogonal when the cross-correlation between them is equal to zero. Common approaches to achieve orthogonality in MIMO systems include time-division multiplexing (TDM), frequency-division multiplexing (FDM), and/or code division multiplexing (CDM).

In a radar system based on conventional linear frequency modulation (LFM) (which uses a frequency-modulated continuous-wave (FMCW)), to achieve fully orthogonal signals in the time-frequency domain, separate transmitters use non-overlapping time intervals that are equally spaced.

While the conventional TDM and FDM schemes achieve orthogonality, such approaches result in an inefficient usage of time and/or frequency resources. Furthermore, such systems are relatively inflexible in tradeoffs between different radar key performance indicator (KPI) specifications and design parameters for a radar.

Traditional approaches to achieve orthogonality are impractical for MIMO systems because such systems often have many transmitters. For example, if a MIMO antenna array includes 12 different transmitters (and in some applications there may be more), the time each transmitter would have to transmit a signal (also referred to herein as a chirp) in a TDM implementation would be only $1/12^{th}$ of a chirp cycle. Providing adequate time for each individual chirp results in a relatively long chirp cycle, which translates into a longer pulse repetition interval (PRI) (the time extending from the beginning of one chirp cycle to the beginning of a subsequent chirp cycle). In some examples, traditional approaches are impractical for TDM-MIMO radar systems to detect fast moving objects.

Furthermore, traditional FMCW MIMO mm-wave radar sensing systems determine the angle of arrival at high resolution by implementing the TDM waveform signals across multiple transmit antennas and forming a virtual array. Additionally, in some traditional examples, maximum unambiguous Doppler velocity detection is defined by the Nyquist rate sampling (e.g., uniform sampling) of the transmit signals per each antenna in a TDM-MIMO waveform. However, this transmit waveform TDM-MIMO scheme limits the detection of slow moving targets when a large number of transmit antennas are employed for increasing the direction of arrival (DOA) resolution. Examples disclosed herein utilize a staggered FMCW TDM MIMO waveform that extends the maximum unambiguous Doppler velocity estimation by N-fold, where N is the number of transmit antennas, while still preserving the orthogonality in the time required for high-resolution DOA estimation. Examples disclosed herein utilize an iterative adaptive spectral estimation approach (IAA) to mitigate global leakage in the spectral window. Examples disclosed herein can detect and/or extend maximum unambiguous radial velocities up to approximately 26.6 m/sec with root mean square error less than approximately 0.01 m/s for SNR values greater than 5 dB as compared to the 2.4 m/sec using a traditional TDM-MIMO waveform. Examples disclosed herein provide a non-uniform sampling in time and non-overlapping transmit antenna sequence that preserves the orthogonality required for the MIMO and AoA processing. Examples disclosed herein increase the functionality of the existing mm-wave FMCW radar sensors to estimate extensive range of Doppler velocities beyond the Nyquist limit within one single TDM-MIMO observation. As used herein, a "sweep signal" is used to refer to any waveform that uses TDM to separate transmitters.

FIG. 1A illustrates an example antenna array 100 for a MIMO radar system. The antenna array 100 includes two transmitters 102, 104 (labelled TX1 and TX2 respectively) and four receivers 106, 108, 110, 112 (labelled RX1, RX2, RX3, and RX4 respectively). Such an arrangement is referred to as a 2×4 MIMO system. The example antenna array 100 is a relatively simple array for purposes of explanation. Examples disclosed herein may be applied to antenna arrays having any suitable number of transmitters and receivers (which may number in the tens or even a hundred or more depending on available space for the array and cost considerations). Further, the transmitters and receivers may be arranged in any suitable manner including, for example, a one-dimensional array as shown in the illustrated example of FIG. 1A or in a two-dimensional array. In some examples disclosed herein, reference may be made to a 2×2 MIMO system, which includes the two transmitters 102, 104, and two receivers 106, 108.

Disregarding any loss of generality, in a radar receiver beamforming system with a single transmitter and multiple receivers (e.g., a single input multiple output (SIMO) system), the angular resolution of the system may be doubled (resolution bins reduced by half) by doubling the number of receivers. As there is only one transmitter, this results in nearly doubling the total number of antennas. For example, if there was only one transmitter in the illustrated example of FIG. 1A, doubling resolution of the radar would require four additional receivers, thereby increasing the total number of antenna elements from 5 to 9. By contrast, in a MIMO radar system, the angular resolution can be doubled merely by doubling the number of transmitters. Thus, the angular resolution of the example system illustrated in FIG. 1A can be doubled by adding two more transmitters, thereby increasing the total number of antenna elements from 6 to 8. As such, higher angular resolutions are possible with a MIMO system with fewer antennas.

In the illustrated example of FIG. 1A, a transmission from the first transmitter 102 may result in a phase of [0, ω, 2ω, 3ω] at the four receivers 106, 108, 110, 112, respectively, with the first receiver 106 as a reference. As shown in the illustrated example, the second transmitter 104 is placed a distance (4d) from the first transmitter 102 that is four times the distance (d) between the receivers 106, 108, 110, 112. As a result, where d is measured in meters, any signal emanating from the second transmitter 104 traverses an additional path of length 4d sin(θ) meters as compared to signals from the first transmitter 102. As such, the signal from the second transmitter 104 detected at each receiver 106, 108, 110, 112 has an additional phase-shift of 4ω (relative to transmission from the first transmitter 102). Accordingly, the phase of the signal from the second transmitter 104 at the four receivers 106, 108, 110, 112 is [4ω, 5ω, 6ω, 7ω]. Concatenating the phase sequences at the four receivers 106, 108, 110, 112, due to transmissions from both transmitters 102, 104, results in the sequence [0 ω 2ω 3ω 4ω 5ω 6ω 7ω]. This is the same sequence that would result from a 1×8 SIMO system. Thus, it can be said that the 2×4 antenna configuration shown in FIG. 1A synthesizes a virtual array of eight receive antennas (with one transmit antenna being implied).

The above example can be generalized to generate a virtual antenna containing N TX and N RX antennas so long as the antennas are properly placed relative to one another. In a MIMO system, the transmission from each transmitter is designed to be separable or distinguishable from all other transmissions from the other transmitters at the receiver. As a result of the separability of the transmitter signals, the system is able to achieve N TX×N RX degrees of freedom with only N TX transmitters and N RX receivers. By contrast, in a conventional beamforming (SIMO) radar system, only N TX+N RX degrees of freedom are achieved with the same number of transmitters and receivers. Thus, MIMO radar techniques result in a multiplicative increase in the number of (virtual) antennas, while also providing an improvement (e.g., increase) in the angular resolution.

Figure 1B:
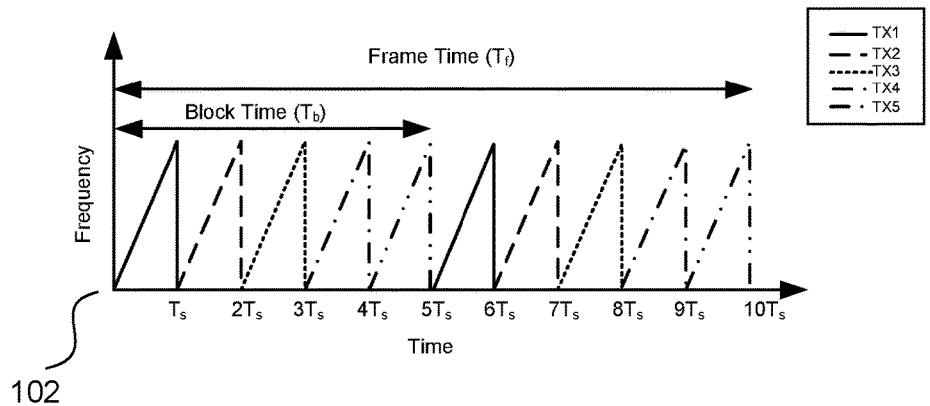
FIG. 1B illustrates an example uniform time division multiplex (TDM) MIMO waveform.

Turning to FIG. 1B, in a traditional TDM-MIMO waveform each frame consists of several blocks 102. Each block 102 consists of $N_{TX}$ time slots each corresponding to transmission of FMCW sweep signal ($T_s$) by one of the TX antennas. In the illustrated example of FIG. 1B, a TDM-MIMO waveform with number of transmit antennas $N_{TX}$=5 and Nblocks=2 is illustrated. In the illustrated example of FIG. 1B, $T_b$ represents the time within which a block 102 is transmitted. As defined herein, the phrase "block time" represents a period of time in which a block is transmitted.

In some examples the phrase "block time" is also referred to as a "time block", or a "block of time." In some examples, $T_b$ can also be interpreted as the uniform sampling time period of the signals received from a particular transmitter when the transmit sequence in multiple blocks is the same. In the illustrated example of FIG. 1B, $T_b$ is calculated using Equation 1, where $T_f$ represents the frame time duration that is a product of Number of sweeps per Tx (Nsweeps$_{Tx}$), $N_{TX}$ and the Sweep time duration ($T_s$). $T_f$ may be calculated using Equation 2.

$$T_b = N_{TX} \times T_s \qquad \text{Equation 1}$$

$$T_f = T_b \times N\text{blocks} = T_s \times N_{TX} \times N\text{sweeps}_{Tx} \qquad \text{Equation 2}$$

Based on $N_{TX}$ transmit antennas and $N_{RX}$ receive antennas a virtual MIMO array of $N_{TX} \times N_{RX}$ (N) elements is created from the TDM MIMO echo signals (e.g., chirps, sweep signals). This is possible due to the separation of transmit signals in time and the echo signals can be reassigned to a particular transmitter. In the case of uniform linear array that consists of N array elements, uniformly separated by distance d, the angular resolution ($\theta_{res}$) at boresight for a transmit signal wavelength $\lambda$ is determined using Equation 3.

$$\theta_{res} = \frac{\lambda}{Nd} = \frac{\lambda}{(N_{TX} \times N_{RX})d} \qquad \text{Equation 3}$$

In the illustrated example of Equation 3, a higher angular resolution can be obtained by increasing a number of virtual array elements that further depends on increasing the number of transmit elements for a MIMO array system.

Figure 1C:
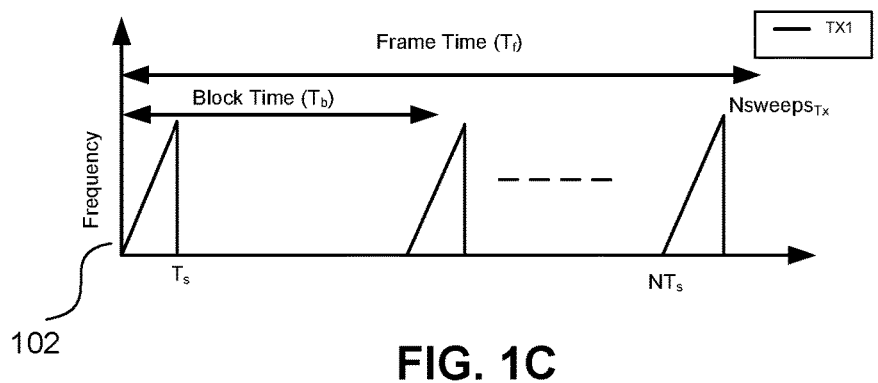
FIG. 1C illustrates example transmit signals in the TDM-MIMO frame to estimate Doppler velocity.

Furthermore, radial velocity of the targets is estimated from the spectral analysis of the echo signals obtained from each Tx antenna across all the blocks. FIG. 1C illustrates an example of the transmit signals from Tx antenna 1 (e.g., transmitter 102) and the corresponding uniform sampling time period.

As such, the radial velocity estimation and the resolution from these samples is determined by Equations 4 and 5 where $f_d$ represents the Doppler shift of the target obtained after spectral estimation.

$$v = \frac{f_d \lambda}{2} \qquad \text{Equation 4}$$

$$v_{res} = \frac{\lambda}{2T_f} \qquad \text{Equation 5}$$

Subsequently, the maximum unambiguous radial velocity ($V_{max}$) is set by the maximum Doppler shift ($f_{dmax}$) that can be estimated from the transmit signal. For a uniform spacing ($T_b$) as illustrated in FIGS. 1B and 1C, $f_{dmax}$ equates to the Nyquist rate as shown in Equation 6. Therefore, $V_{max}$ is calculated by substituting Equation 6 into Equation 4, resulting in Equation 7.

$$f_{dmax} = \frac{1}{2T_b} \qquad \text{Equation 6}$$

$$V_{max} = \frac{f_{dmax} \lambda}{2} = \frac{\lambda}{4T_b} \qquad \text{Equation 7}$$

Substituting Equation 1 into Equation 7, $C_{max}$ for a traditional TDM-MIMO array is determined by Equation 8.

$$V_{max} = \frac{\lambda}{4N_{Tx}T_s} \qquad \text{Equation 8}$$

Equation 8 illustrates that $V_{max}$ can be increased by decreasing the number of transmit antennas ($N_{Tx}$) in TDM-MIMO waveform scheme. However, when the $N_{Tx}$ are decreased according to Equation 3 the angular resolution also decreases. Therefore, traditional TDM-MIMO schemes limit the detection to slow moving targets when a large number of transmit antennas are employed for increasing the angular resolution.

Figure 2A:
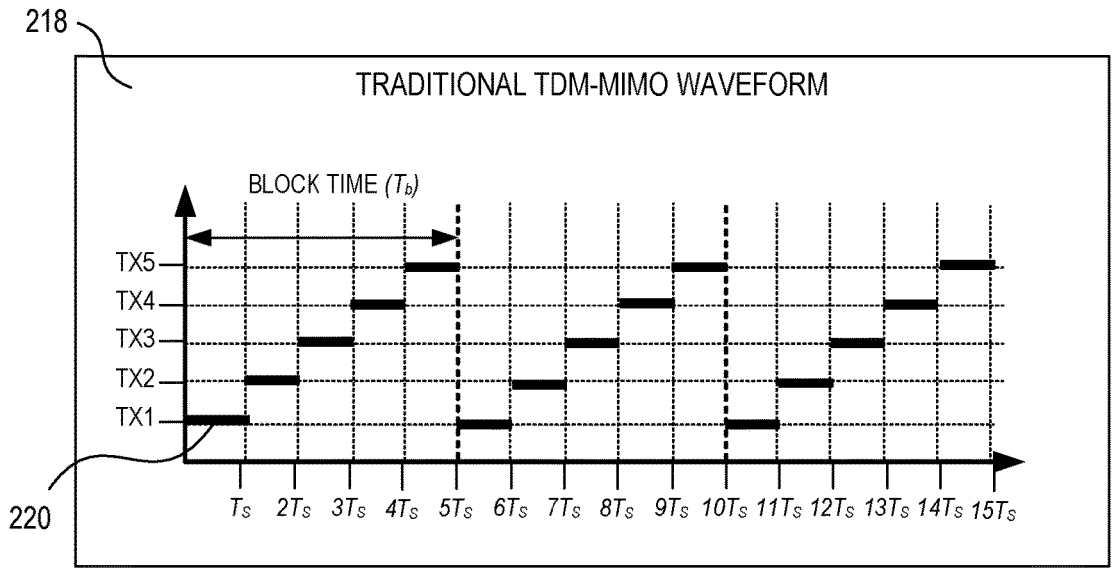
FIG. 2A illustrates an example TDM-MIMO waveform transmit time position per each antenna.
Figure 2A:
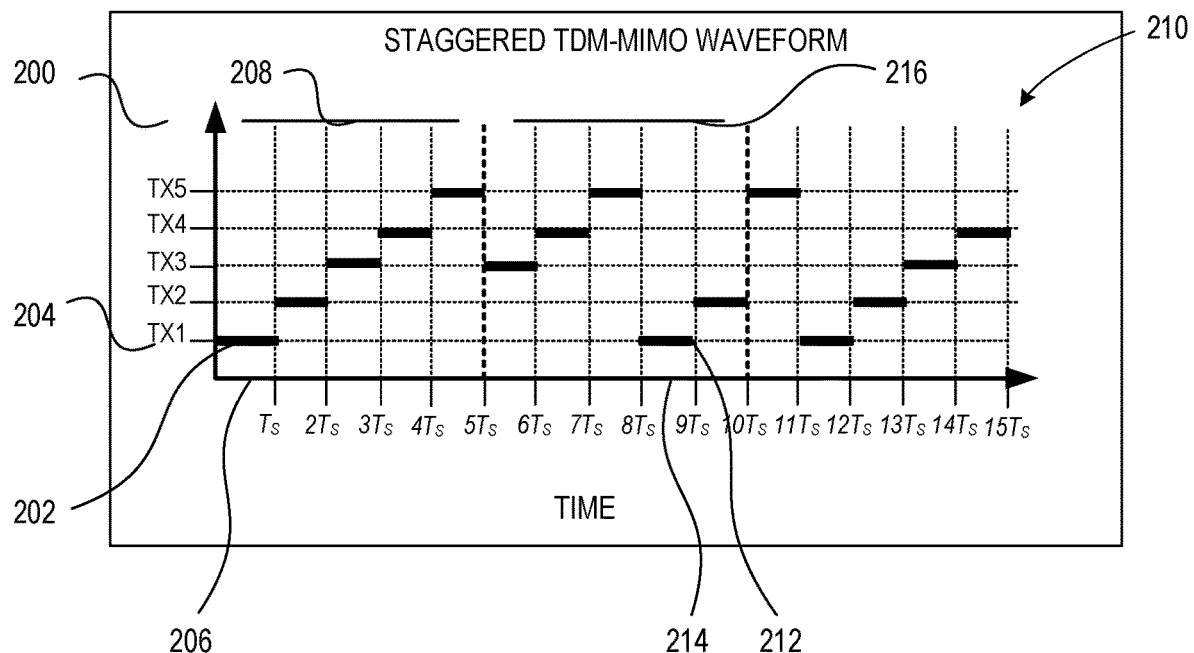

Examples disclosed herein increase $V_{max}$ using the same number of transmit antennas ($N_{Tx}$) utilizing a staggered TDM MIMO waveform design. Turning to FIG. 2A, a staggered TDM MIMO waveform design 200 is illustrated. In the illustrated example of FIG. 2A, a first sweep signal 202 is transmitted from a first transmit antenna 204 at a first position 206 in a first time block 208 during a transmit time sequence pattern 210. Furthermore, the TDM MIMO waveform design 200 includes a second sweep signal 212 transmitted from the first transmit antenna 204 at a second position 214 in a second block time 216 during the transmit time sequence pattern 210. In the illustrated example, the second position 214 is different than the first position 206. In the illustrated example, the first position 206 and the second position 214 are non-uniform and non-overlapping in relation to other sweep signals transmitted during the transmit time sequence pattern 210 to maintain orthogonality. This is in contrast to the traditional TDM MIMO waveform design 218 where the sweep signal 220 is transmitted at the same position during each block time during the transmit time sequence pattern.

The staggered TDM MIMO waveform design 200 results in a non-uniform sampling of slow time signals per each Tx antenna. In some examples, the position of the transmit signals from the remaining Tx antennas may be incremented by 1 from the pseudo random position set by the first antenna. To keep the block time ($T_b$) constant, the absolute value of the increment position is considered with respect to $N_{Tx}$ elements when the increment exceeds the block time ($T_b$).

In some examples, the staggered TDM MIMO waveform design 200 transmit time positions per each transmit antenna are calculated by Equation 9.

$$t_i^1 = ((i-1)*N_{TX} + (g_i^1 - 1))T_s \qquad \text{Equation 9}$$

Where $t_i^1$ represents the start time of the sweep signal in the $i^{th}$ block from Tx1 antenna, and $g_i^1$ represents the timing position of the transmit signal in the $i^{th}$ block at Tx1 antenna. In the illustrated example of FIG. 2A, $g_i^1 = [1, 4, 2]$ and $t_i^1 = [0, 8 T_s, 11 T_s]$. In some examples, block time is constant across all the blocks ($T_b$), resulting in $g_i \in [1, N_{TX}] \in Z$ and i=1, 2, 3, 4, . . . . Nblocks. In some examples, $T_s$ is the greatest common divisor for all ($t_i^1 - t_1^1$) when $g_i^1$ is different for all i. As such, the Nyquist rate and the maximum Doppler shift for such non uniform sampling sequence is determined using Equations 10 and 11.

$$f_{dmax} = \frac{1}{2gcd(t_i^1 - t_1^1)} = \frac{1}{2T_s} \qquad \text{Equation 10}$$

Based on Equation 4 above, $$\text{staggered\_v}_{max} = \frac{\lambda}{4T_s} \quad \text{Equation 11}$$

Comparing Equation 11 to the $V_{max}$ obtained in traditional TDM-MIMO case in Equation. 8, the staggered TDM MIMO waveform $V_{max}$ is $N_{Tx}$ times the $V_{max}$ obtained from the traditional TDM-MIMO waveform, which is rewritten as Equation 12.

$$\text{staggered\_}v_{max} = NT_x \text{uniform\_}v_{max} \quad \text{Equation 12}$$

In some examples, if $g_i^1$ is the same for all i, it is similar to the uniform sampling or traditional TDM-MIMO waveform with the greatest common divisor for all $(t_i^1 - t_1^1)$ equal to $N_{Tx} \times T_s$ which is equivalent to $T_b$ (see Equation 1).

In some examples, staggered transmit position sequence and the sampling time for the remaining transmit antennas in the TDM-MIMO frame is given in Equation 13. In some examples, when sweep time $(T_s)$ is constant across each Tx antenna in all the blocks, the staggered position sequence defined by Equations 13 and/or 9 results in the same unambiguous velocity detection across all the echo signals obtained from staggered TDM-MIMO waveform.

$$g_i^{n+1} = \begin{cases} g_i^n + 1, & g_i^n < N_{Tx} \\ g_i^n = 1 \bmod N_{tx}, & g_i^n \geq N_{Tx} \end{cases} \quad \text{Equation 13}$$

Where $n = 1, 2, 3, \ldots N_{Tx} - 1$

Figure 3:
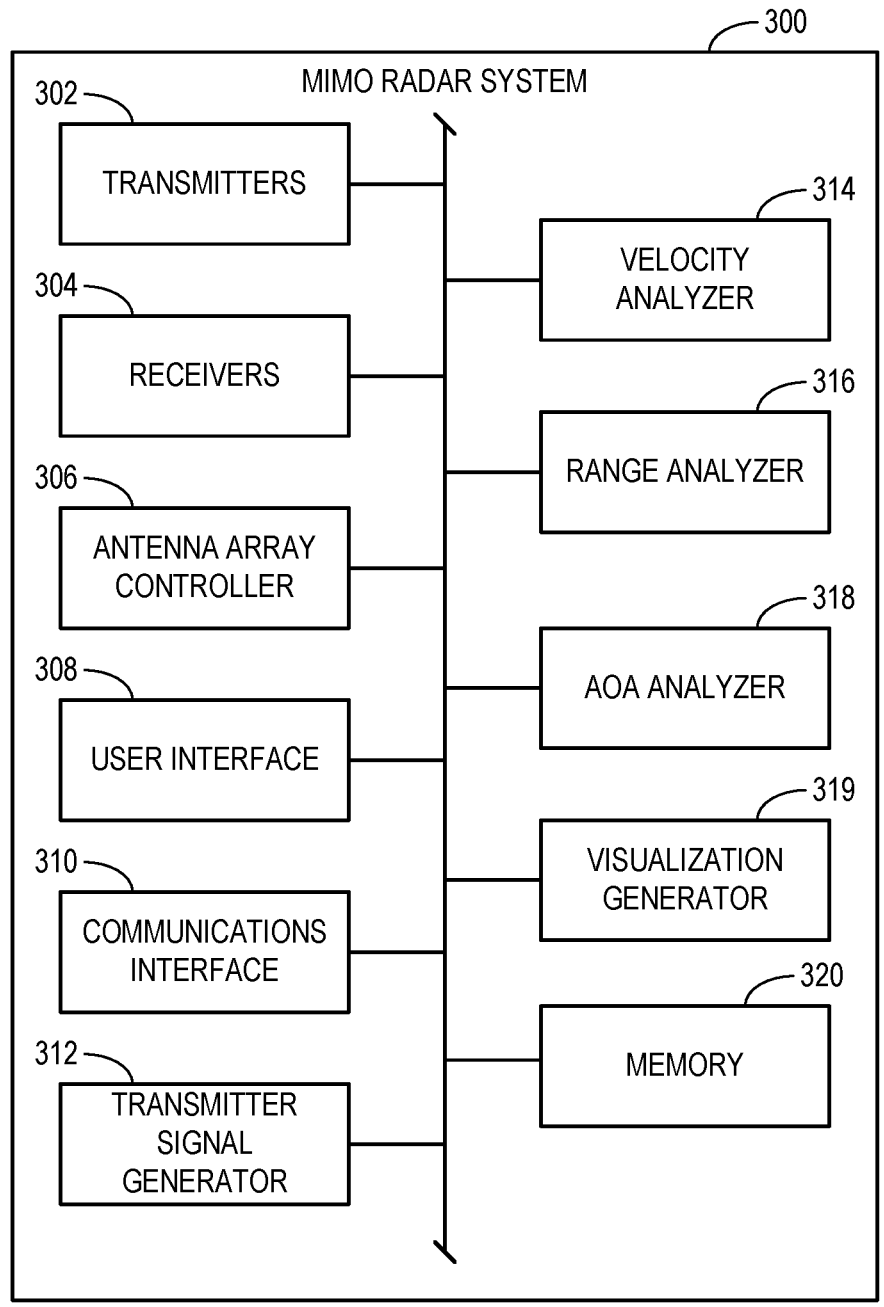
FIG. 3 illustrates an example MIMO radar system constructed in accordance with teachings disclosed herein to improve unambiguous Doppler velocity estimation.

FIG. 3 is an example MIMO radar system 300 constructed in accordance with teachings disclosed herein to improve maximum unambiguous Doppler velocity estimation. As shown in the illustrated example, the radar system 300 includes any suitable number of transmitters 302 and any suitable number of receivers 304 arranged in any suitable manner in an antenna array. The example radar system 300 further includes an example antenna array controller 306, an example user interface 308, an example communications interface 310, an example transmitter signal generator 312, an example velocity analyzer 314, an example range analyzer 316, an example direction of arrival (DOA) analyzer 318, an example visualization generator 319, and an example memory 320. In some examples, the transmitter 302 is a means for transmitting, or a transmitting means. In some examples, the receiver 304 is a means for receiving, or a receiving means. In some examples, the antenna array controller 306 is a means for controlling an antenna array, or an antenna array controlling means. In some examples, the transmitter signal generator 312 is a means for generating a transmitter signal, or a transmitter signal generating means. In some examples, the velocity analyzer 314 is a means for analyzing velocity, or a velocity analyzing means. In some examples, the range analyzer 316 is a means for analyzing a range, or a range analyzing means. In some examples, the DOA analyzer 318 is a means for analyzing DOA, or an DOA analyzing means. In some examples, the visualization generator 319 is a means for generating a visualization, or a visualization generating means.

The example radar system 300 of FIG. 3 includes the example antenna array controller 306 to facilitate and/or control the operation of the transmitters and/or receivers. For example, the antenna array controller 306 may cause the transmitters to transmit appropriate signals as generated by the radar system and to handle the initial processing of signals received by the separate receivers 304. Further, the antenna array controller 306 serves as an interface to enable interactions between the antenna array (e.g., including the transmitters 302 and the receivers 304) and other components of the radar system 300. Although a single antenna array controller 306 is represented in FIG. 3, in some examples, the transmitters 302 may be associated with a first antenna array controller 306 and the receivers 304 may be associated with a second antenna array controller 306. In other examples, each transmitter 302 and/or each receiver 304 may be associated with an individual controller.

The example radar system 300 of FIG. 3 includes the example user interface 308 to enable a user to input and/or configure parameters defining the operation of the radar system. That is, in some examples, a user may provide relevant design specifications (e.g., maximum range, maximum unambiguous velocity, range resolution, velocity resolution, etc.) that serve as the basis to define the particular nature of the waveform for the chirps transmitted by the different transmitters. In some examples, the radar design specifications and corresponding transmitter signal waveform parameters are stored in the example memory 320. Additionally, in some examples, the user interface 308 provides the results of the analysis of signals received at the different receivers 304 indicative of the different dimensions measured by the radar system for detected targets (e.g., range, velocity, elevation, and azimuth). In some examples, the user interface 308 may be omitted. In some such examples, user inputs are received from a separate system via the example communications interface 310. Likewise, the communications interface 310 may provide the results of the analysis of the signals received at the receivers 304 for display to a user via the separate system. In some examples, the separate system may be local to the example MIMO radar system 300. In other examples, the separate system may be remote from the radar system 300 but in communication with the radar system 300 via the communications interface 310 via a network.

The example radar system 300 of FIG. 3 includes the example transmitter signal generator 312 to define and generate individual chirps to be transmitted by individual ones of the transmitters 302. Further, in some examples, the transmitter signal generator 312 defines how different ones of the chirps are to be combined to form a full chirp cycle. In some examples, the different chirps are separated by a time delay $(\tau_{tdm})$ associated with the TDM waveform. In some examples, the different chirps are separated by a frequency offset $(\Delta f)$ associated with the FDM waveform. In some examples, the individual chirps, a complete chirp cycle, and/or a combined series chirp cycles within a circular chirp cycle radar frame are generated in advance and stored in the memory 320 prior to being transmitted by the transmitters 302. In some examples, the chirps may be generated based on the staggered approach disclosed herein. In some examples, the transmitter signal generator 312 defines that all transmitters 302 are to transmit sweep signals based on Equation 10 in each N blocks.

The example radar system 300 of FIG. 3 includes the example velocity analyzer 314 to determine the Doppler rate (e.g., radial velocity) and Doppler motion phase values corresponding to different targets reflecting the echo signals received by the receivers 304. In some examples, the Doppler motion phase values are based on an IAA analysis of the received signals along the Doppler dimension.

The example radar system 300 of FIG. 3 includes the example range analyzer 316 to determine the range of targets detected based on the echo signals received by the receivers 304. In some examples, the range of targets is determined based on a cross-correlation analysis of the received echo signals relative to the corresponding transmitter chirps.

The example radar system 300 of FIG. 3 includes the example direction of arrival (DOA) analyzer 318 to calculate the direction of arrival of targets detected by the receivers. In some examples, the DOA analyzer 318 calculates the DOA based on an IAA analysis of the virtual array.

The example radar system 300 of FIG. 3 includes the example visualization generator 319 to generate visualizations indicative of the outputs of one or more of the example velocity analyzer 314, the example range analyzer 316, and the example DOA analyzer 318. More particularly, in some examples, the visualization generator 319 generates plots or maps of the range and Doppler motion indicated by an analysis of the received echo signals. In some examples, the visualization generator 319 generates plots or maps of DOA estimation values in a normalized (e.g., uniform) grid. In some examples, the visualization generator 319 generates plots or maps of DOA estimation values in a nonuniform (e.g., polar) grid. The visualizations of the visualization generator 319 may be provided to the user interface 308 and/or the communications interface 310 to be provided to a user for viewing.

In some examples, the velocity analyzer 314 determines Doppler velocity estimation. For example, the velocity analyzer 314 estimates Doppler shift and the corresponding radial velocity of targets from the spectral analysis of the echo signals obtained per each Tx antenna across all the blocks. In some examples, spectral estimation based on Discrete Fourier Transform (DFT) of the echo signals determined by Equation 14 where $x_i$ represents the echo signal obtained from $i^{th}$ block, $t_i$ represents the non uniform sampling time as defined in Equation 9, f represents the Doppler frequency values and X(f) represents the corresponding Doppler spectrum.

$$X(f) = \sum_{i=1}^{Nsweeps_{Tx}} x_i e^{-j2\pi f t_i} \quad \text{Equation 14}$$

In some examples, the spectral estimate is determined using DFT. However, DFT suffers from a strong local leakage due to the side lobes caused by the staggered sampling nature of $t_i$. Therefore, DFT processing fails to estimate the Doppler shift/velocity when multiple moving targets are present. Examples disclosed herein perform spectral analysis based on the Iterative Adaptive processing (IAA). In some examples, the IAA approach is a non-parametric spectral estimation method based on iteratively weighted least-square periodogram. IAA estimates weighted components (e.g., data-dependent) based on the most recent spectral parameters. In some examples, the iteration process is terminated when the relative change in the estimated spectral component reaches a user defined threshold.

FIGS. 4-7 will be discussed in relation to the following data illustrated in Tables 1 and 2.

TABLE 1

Transmit position sequence pattern $g_i^1$ across 32 blocks

| Case | NTx | $g_i^1$ | Leakage level (dB) |
|---|---|---|---|
| II | 6 | [1, 1, 4, 4, 5, 3, 4, 1, 41, 3, 54, 3, 4, 2, 3, 4, 3, 5, 3, 3, 4, 1, 15, 51, 2, 5, 5, 4] | −10.17 |
| III | 9 | [1, 4, 4, 5, 1, 8, 1, 7, 1, 5, 1, 27, 8, 1, 4, 5, 32, 7, 3, 8, 4, 3, 74, 36, 6, 8, 2, 5] | −9.83 |
| IV | 12 | [11, 6, 11, 8, 7, 10, 4, 7, 3, 9, 5, 11, 11, 3, 6, 2, 9, 11, 11, 9, 10, 8, 11, 1, 7, 6, 2, 10, 2, 9, 2] | −9.73 |

TABLE 2

Uniform and staggered TDM-MIMO waveform parameters

| | Case I (uniform) | Case II | Case III | Case IV |
|---|---|---|---|---|
| Number of transmit antenna elements ($N_{Tx}$) | 12 | 6 | 9 | 12 |
| Sweep Time ($T_s$) | 32 μsec | 63 μsec | 43 μsec | 32 μsec |
| $Nsweeps_{Tx}$/Nblocks | 32 | 32 | 32 | 32 |
| Sampling pattern | Traditional TDM-MIMO (uniform sampling) | Staggered TDM-MIMO | Staggered TDM-MIMO | Staggered TDM-MIMO |
| Frame time ($T_f$) (msec) | 12.3 | 12.1 | 12.4 | 12.3 |
| Center Frequency (Fc) | 79 GHz | 79 GHz | 79 GHz | 79 GHz |
| Theoretical Nyquist rate frequency ($f_{dmax}$) | 1.30 KHz (see Eq. (6)) | 7.9 KHz (see Eq. (10)) | 11.62 KHz (see Eq. (10)) | 15.62 KHz (see Eq. (10)) |
| Max. Unambiguous velocity ($V_{max}$) | 2.47 m/s | 15.05 m/s | 22 m/s | 29.6 m/s |

The total number of possible combinations of the staggered transmit position sequences at each Tx antenna that satisfies Equation 9 and results in the maximum unambiguous Doppler velocity defined in Equation 11 is given as follows: $N_{TX}^{Nblocks}$-$N_{TX}$.

Table 1 illustrates example combinations of staggered TDM-MIMO transmit position sequence that minimize the global leakage in the spectral window for Nblocks=32.

FIGS. 4-7 illustrate the corresponding transmit signal sample pattern for $g_i^1$ values given in Table 1 and waveform parameters in Table 2. In some examples, the spectral window determined using Equation 15.

$$G(f) = \frac{\left|\sum_{K=1}^{Nsweep_{Tx}} e^{j2\pi f t_i}\right|^2}{Nsweeps_{Tx}^2} \quad \text{Equation 15}$$

In the illustrated examples of FIGS. 4-7, the estimated spectral window is symmetrical with respect to the theoretical Nyquist rate ($f_{dmax}$) calculated from Equations 11, and/or 8.

Figure 4:
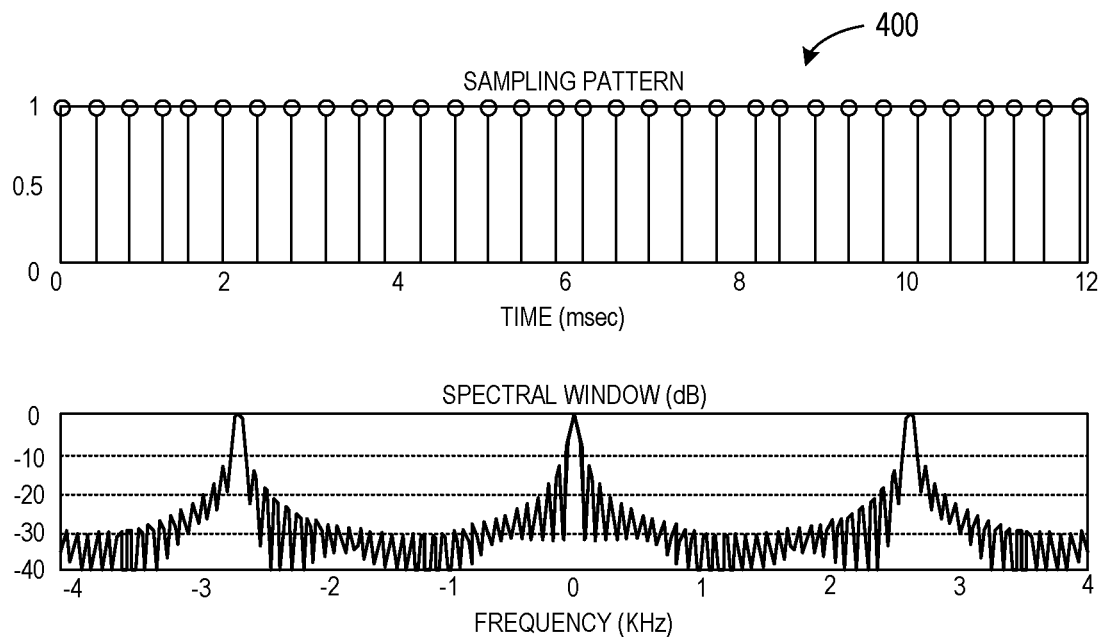
FIG. 4 illustrates an example TDM-MIMO sampling pattern and an example corresponding spectral window.

Turning to FIG. 4, data relationship 400 illustrates the traditional TDM-MIMO sampling pattern and the corresponding spectral window for the case I. In the illustrated example of FIG. 4, the uniform sampling pattern is obtained given $g_i^1=1$ for all i in Equation. 9, and the spectral window is symmetrical with respect to the theoretical Nyquist rate (1.3021 KHz).

Figure 5:
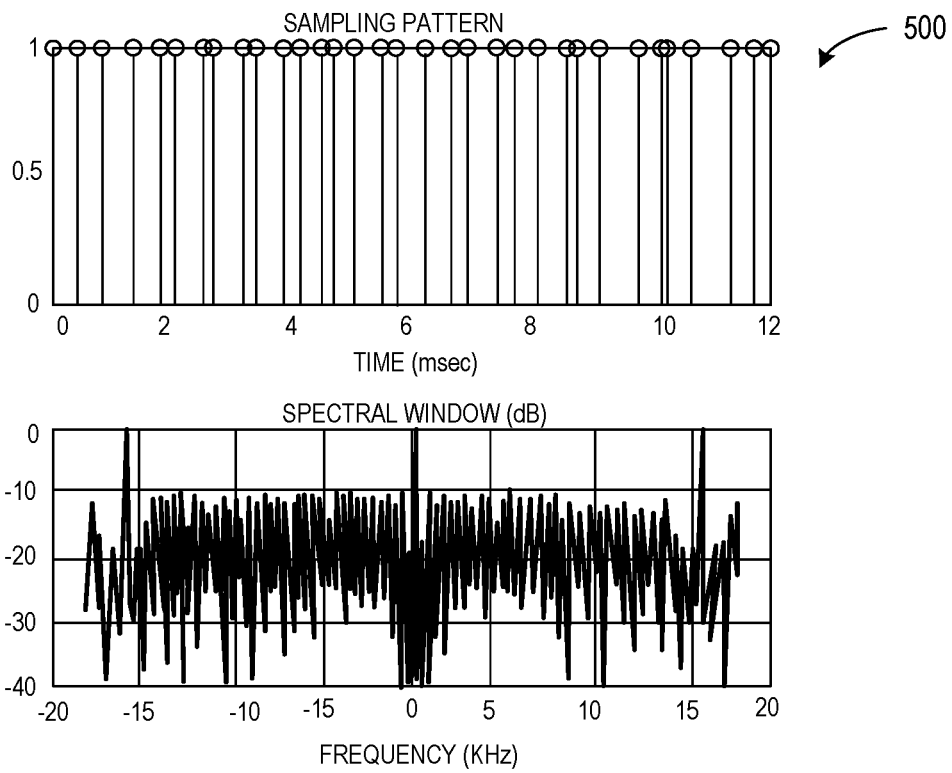
FIG. 5 illustrates another example TDM-MIMO sampling pattern and another example corresponding spectral window.

Turning to FIG. 5, data relationship 500 illustrates Case II from Tables 1 and 2. In the illustrated example of FIG. 5, the staggered sampling pattern is obtained given $N_{Tx}=6$ and $g_i^1=[1, 1, 4, 4, 5, 3, 4, 1, 41, 3, 54, 3, 4, 2, 3, 43, 5, 3, 3, 4, 1, 15, 51, 2, 5, 5, 4]$ for i=1, 2, 3, 4, . . . 32 in Equation 9, and the spectral window is symmetrical on both the positive and negative side with respect to the theoretical Nyquist rate (7.9 KHz).

Figure 6:
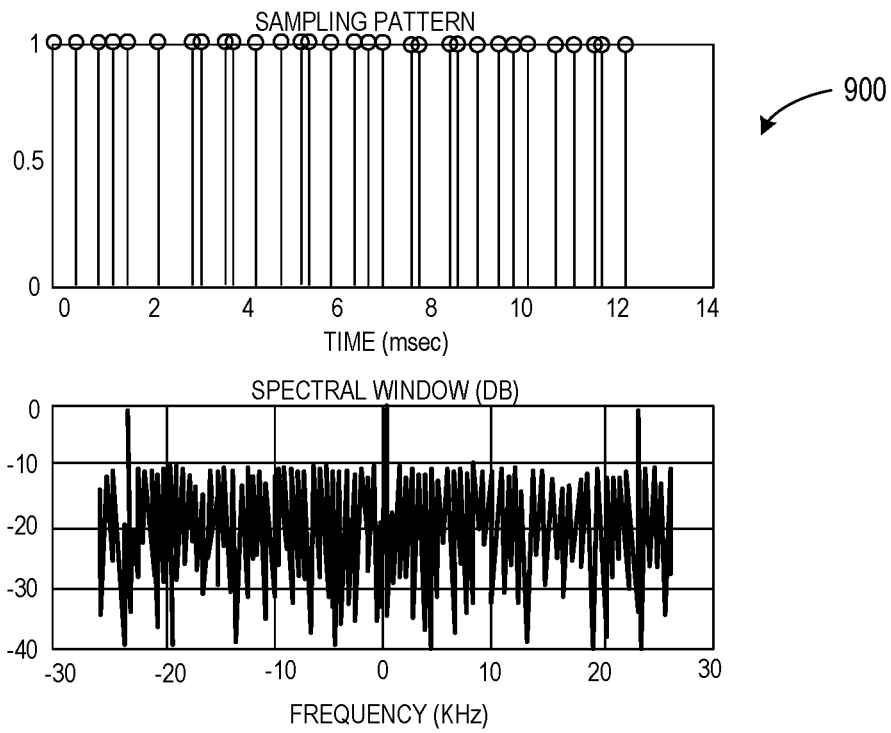
FIG. 6 illustrates another example TDM-MIMO sampling pattern and another example corresponding spectral window.

Turning to FIG. 6, data relationship 600 illustrates Case III from Tables 1 and 2. In the illustrated example of FIG. 6, the staggered sampling pattern is obtained given $N_{Tx}=9$ and $g_i^1=[1, 4, 4, 5, 1, 8, 1, 7, 1, 5, 1, 27, 8, 1, 4, 5, 32, 7, 3, 8, 4, 3, 74, 36, 6, 8, 2, 5]$ for i=1, 2, 3, 4, . . . 32 in Equation. 9, and the spectral window is symmetrical on both the positive and negative side with respect to the theoretical Nyquist rate (11.62 KHz).

Figure 7:
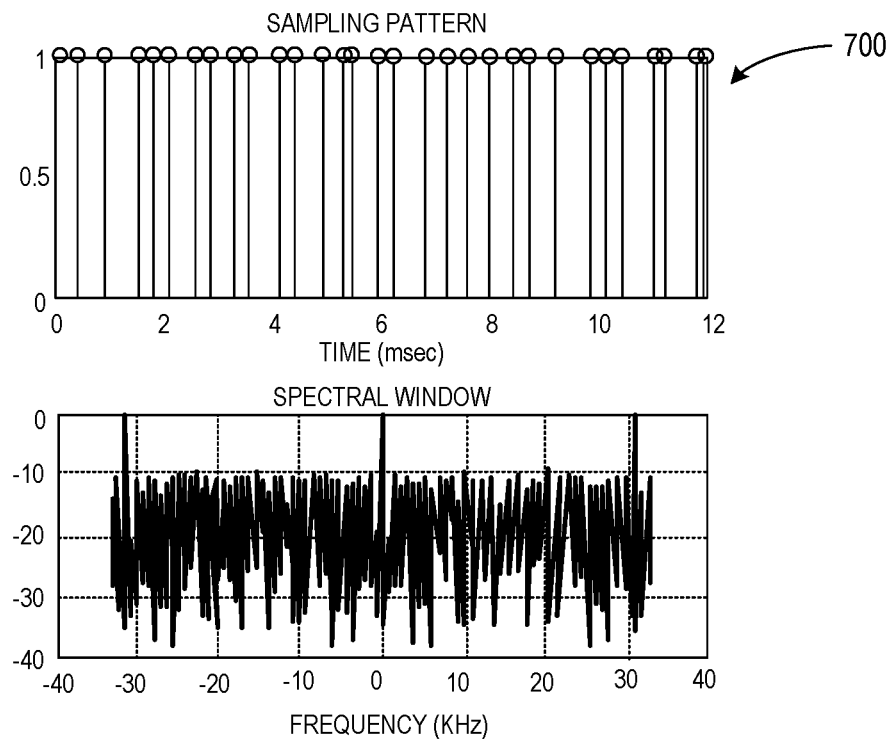
FIG. 7 illustrates another example TDM-MIMO sampling pattern and another example corresponding spectral window.

Turning to FIG. 7, data relationship 700 illustrates Case IV from Tables 1 and 2. In the illustrated example of FIG. 7, the staggered sampling pattern is obtained given $N_{Tx}=12$ and $g_i^1=[11, 6, 11, 8, 7, 10, 4, 7, 3, 9, 5, 11, 11, 3, 6, 2, 9, 11, 11, 9, 10, 8, 11, 1, 7, 6, 2, 10, 2, 9, 2]$ for i=1, 2, 3, 4, . . . 32 in Equation. 9, and the spectral window is symmetrical on both the positive and negative side with respect to the theoretical Nyquist rate (15.62 KHz).

FIGS. 8-12 will be discussed in relation to the following data illustrated in Tables 3 and 4.

TABLE 3

An example five target simulation case with different SNR and Doppler shift values.

|  | Target 1 | Target 2 | Target 3 | Target 4 | Target 5 |
|---|---|---|---|---|---|
| SNR (dB) | 40 | 20 | 20 | 40 | 30 |
| Doppler shift (KHz) | −11 | −3.9 | 0 | 7.64 | 15 |

TABLE 4

An example radar configuration

| Tx Coordinates (m) | (0, 0, 0) |
|---|---|
| Rx1 Coordinates (m) | (0.05, 0, 0) |
| Rx2 Coordinates (m) | (0.05 + $^{+80}/_2$, 0, 0) |
| Target Coordinates (m) | (0, 30, 0) |

In some examples, the velocity analyzer 314 determines Doppler shift estimation. For example, a five target object model is simulated with the Signal-to-Noise ratio values (SNR) and Doppler shift parameters shown in Table 3. The moving target objects are modeled as a point source and are assumed to be in the far-field range at boresight (az=0°, el=0°) distance (r=30 m). In the illustrated examples of FIGS. 8-12, transmitter and receiver coordinates are given in Table 4. In the illustrated examples of FIGS. 8-12, target object velocities are considered to be constant during the frame duration (e.g., a single observation). In some examples, the velocity analyzer 314 determines a signal model using Equation 16, where $A_n$ represents the amplitude of the $n^{th}$ target, $fd_n$ denotes the Doppler shift of the $n^{th}$ target and n(t) denotes the white Gaussian noise. In some examples, staggered TDM-MIMO waveform design parameters are given in the Table 1 case IV and $t_i$ values are determined using Equation 9.

$$x(r, t_i) = \sum_{n=1}^{Ntargets} A_n e^{-j2\pi fd_n t_i} e^{-\frac{j4\pi r}{\lambda}} + n(t) \quad \text{Equation 16}$$

Figure 8:
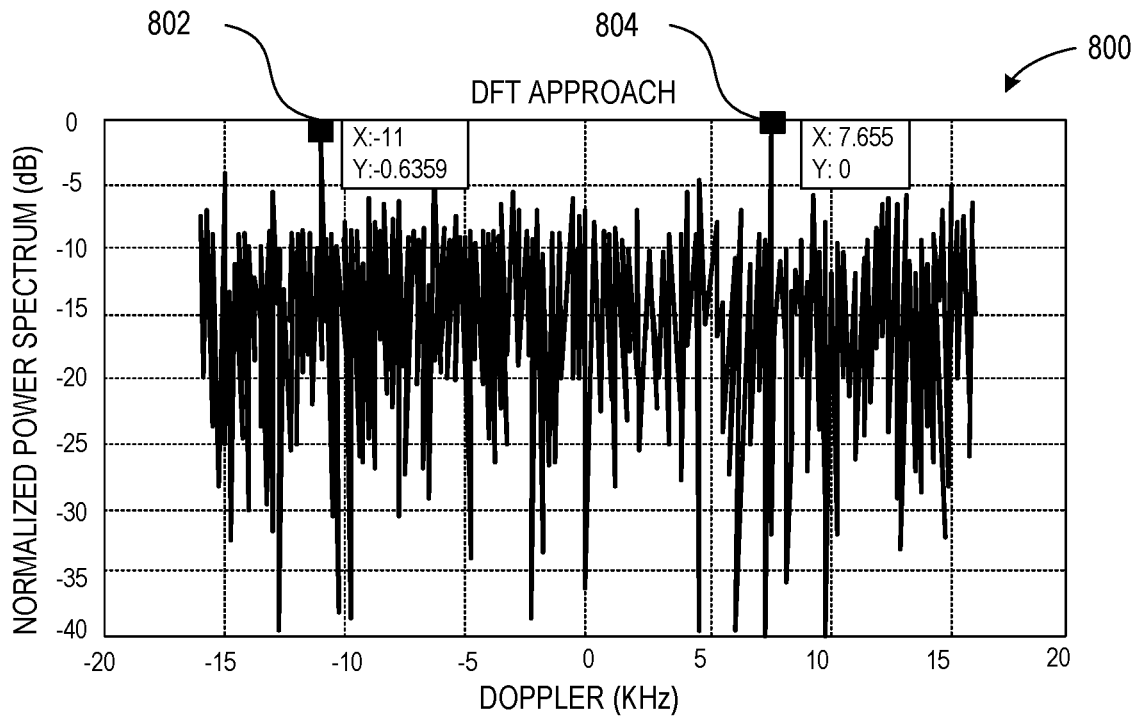
FIG. 8 illustrates an example power spectrum after Discrete Fourier Transform (DFT) processing.

Turning to FIG. 8, data relationship 800 illustrates the result of DFT processing to estimate the normalized Doppler spectrum and to measure the corresponding velocities. For example, when the transmit position sequence in FIG. 7 is employed to detect velocity of target objects in Table 3 example TX waveform parameters are illustrated in Table 2, case IV. In some examples, due to the strong leakage, DFT processing fails to detect multiple targets. As such, in the illustrated example of FIG. 8, only two of the five targets are detected at −11 and 7.64 KHz, illustrated by points 802 and 804 respectively.

Figure 9:
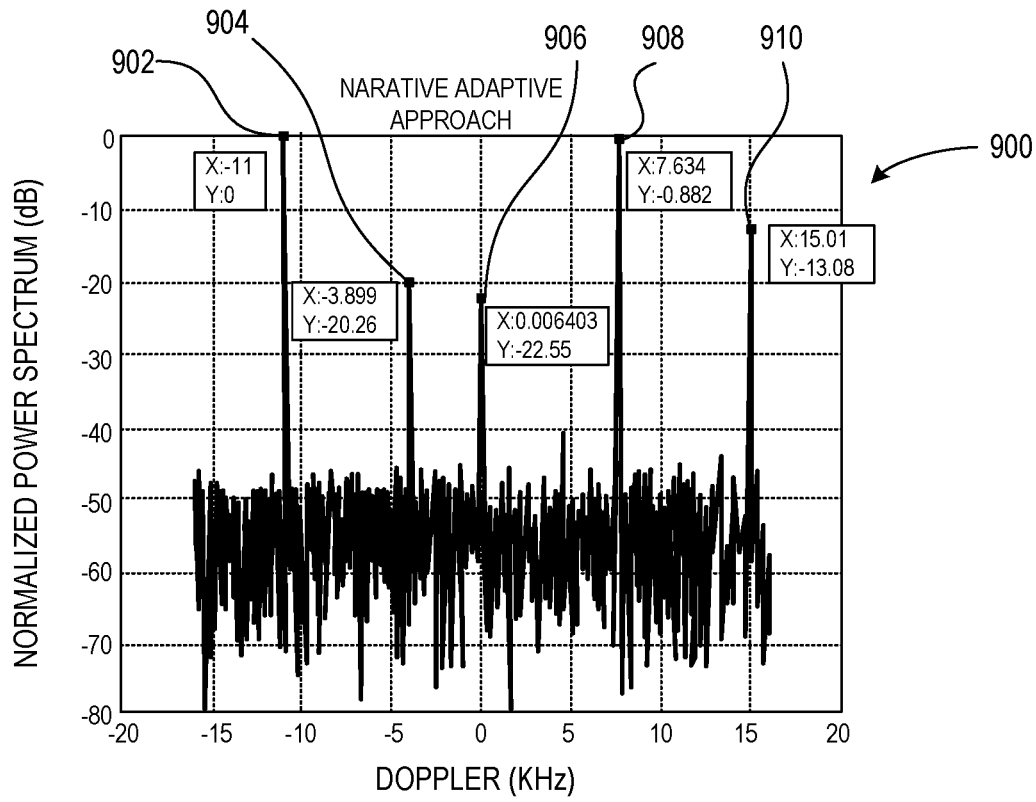
FIG. 9 illustrates an example power spectrum after iterative adaptive spectral estimation approach (IAA) processing.

Turning to FIG. 9, data relationship 900 illustrates the result of IAA processing with stopping criteria of fifty iterations or threshold difference of $10^{-4}$ to estimate the normalized Doppler spectrum. FIG. 9 illustrates that the IAA processing is able to estimate the Doppler spectral components for all the five simulated targets and the peak values proportional to the SNR content given in Table 3, illustrated by points 902, 904, 906, 908, and 910 respectively.

Figure 10:
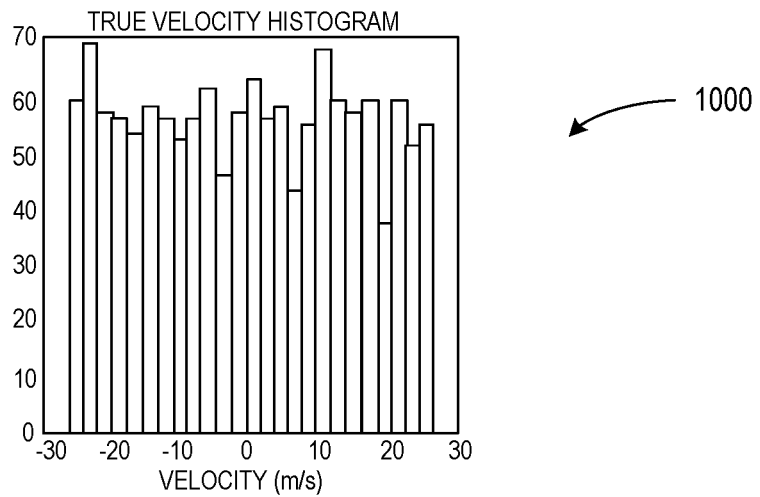
FIG. 10 illustrates an example histogram of velocity estimates across signal-to-noise ratio (SNR) values.
Figure 11:
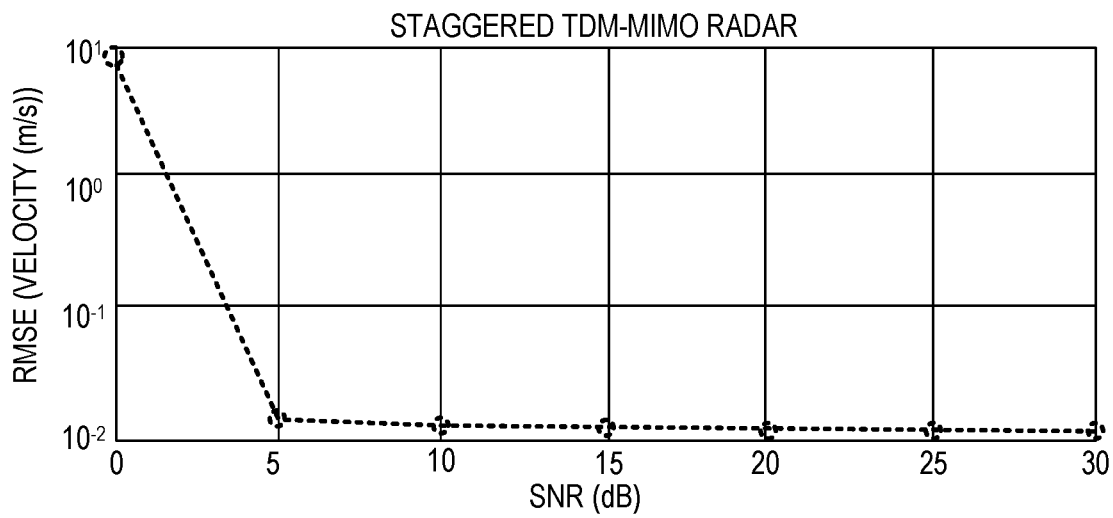
FIG. 11 illustrates an example root mean square error of the estimated velocity obtained from the IAA processing in FIG. 9.
Figure 12:
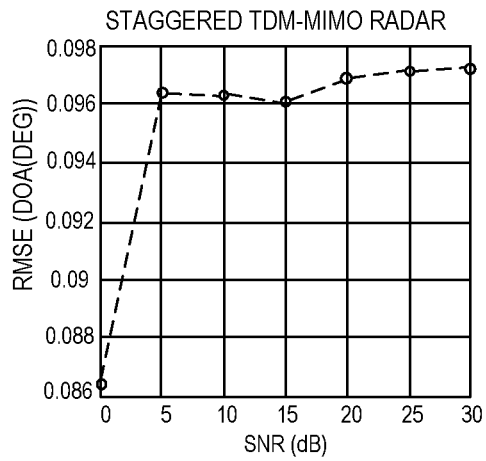
FIG. 12 illustrates an example root mean square error of an example direction of arrival.

FIGS. 10-12 will be discussed in relation to a scenario including one transmitter and two receivers uniformly spaced at distance, where λ represents wavelength. In some examples, position coordinates are given in Table 4 from above, and the staggered TDM-MIMO waveform design parameters are given in the Table 1 case IV. In the illustrated example of FIGS. 10-12, two hundred independent Monte Carlo simulations are carried out for each SNR varying from 0 dB to 30 dB with 5 dB step. In some examples, the true Doppler velocity of a single target object is selected randomly in each trial between [−26.6 26.6] m/s, and the received signal is modelled as per the Equation 16 at two receiver locations.

In the illustrated example of FIGS. 10-12, IAA processing is first implemented to estimate the Doppler shift at both Rx locations. In some examples, the stopping criteria for IAA processing is set to $10^{-4}$ and the maximum iteration limit of 15. Subsequently, the phase information from the spectral peaks at the respective target object Doppler shift across both the receivers is extracted to determine the DOA (degrees) using Equation 17, where w corresponds to the phase difference across the signals received at both the Rx antennas, and d represents the spacing between the Rx antennas.

$$DOA(\theta) = \sin^{-1}\left(\frac{\omega\lambda}{2\pi d}\right) \qquad \text{Equation 17}$$

FIG. 10 illustrates a histogram 1000 of the velocity values selected in the Monte Carlo simulations and FIGS. 11 and/or 12 illustrate the RMSE of the estimated velocity and DOA parameters. As shown in the illustrated examples of FIGS. 11 and 12, the RMSE is less than 0.01 m/s for SNR values greater than 5 dB while still preserving the phase content to estimate the DOA. As such, examples disclosed herein can detect and/or extend maximum unambiguous Doppler velocities up to 26.6 msec (moving towards and away) with root mean square error less than 0.01 m/s for SNR values greater than 5 dB vs 2.4 m/sec using a traditional TDM-MIMO waveform.

While an example manner of implementing radar system 300 is illustrated in FIG. 3, one or more of the elements, processes and/or devices illustrated in FIG. 3 may be combined, divided, re-arranged, omitted, eliminated and/or implemented in any other way. Further, the example transmitter signal generator 312, the example velocity analyzer 314, the example range analyzer 316, the example direction of arrival (DOA) analyzer 318, the example visualization generator 319 and/or, more generally, the radar system 300 of FIG. 3 may be implemented by hardware, software, firmware and/or any combination of hardware, software and/or firmware. Thus, for example, any of the example transmitter signal generator 312, the example velocity analyzer 314, the example range analyzer 316, the example direction of arrival (DOA) analyzer 318, the example visualization generator 319 and/or, more generally, the radar system 300 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, transmitter signal generator 312, the example velocity analyzer 314, the example range analyzer 316, the example direction of arrival (DOA) analyzer 318, the example visualization generator 319 and/or, more generally, the radar system 300 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example radar system 300 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 13:
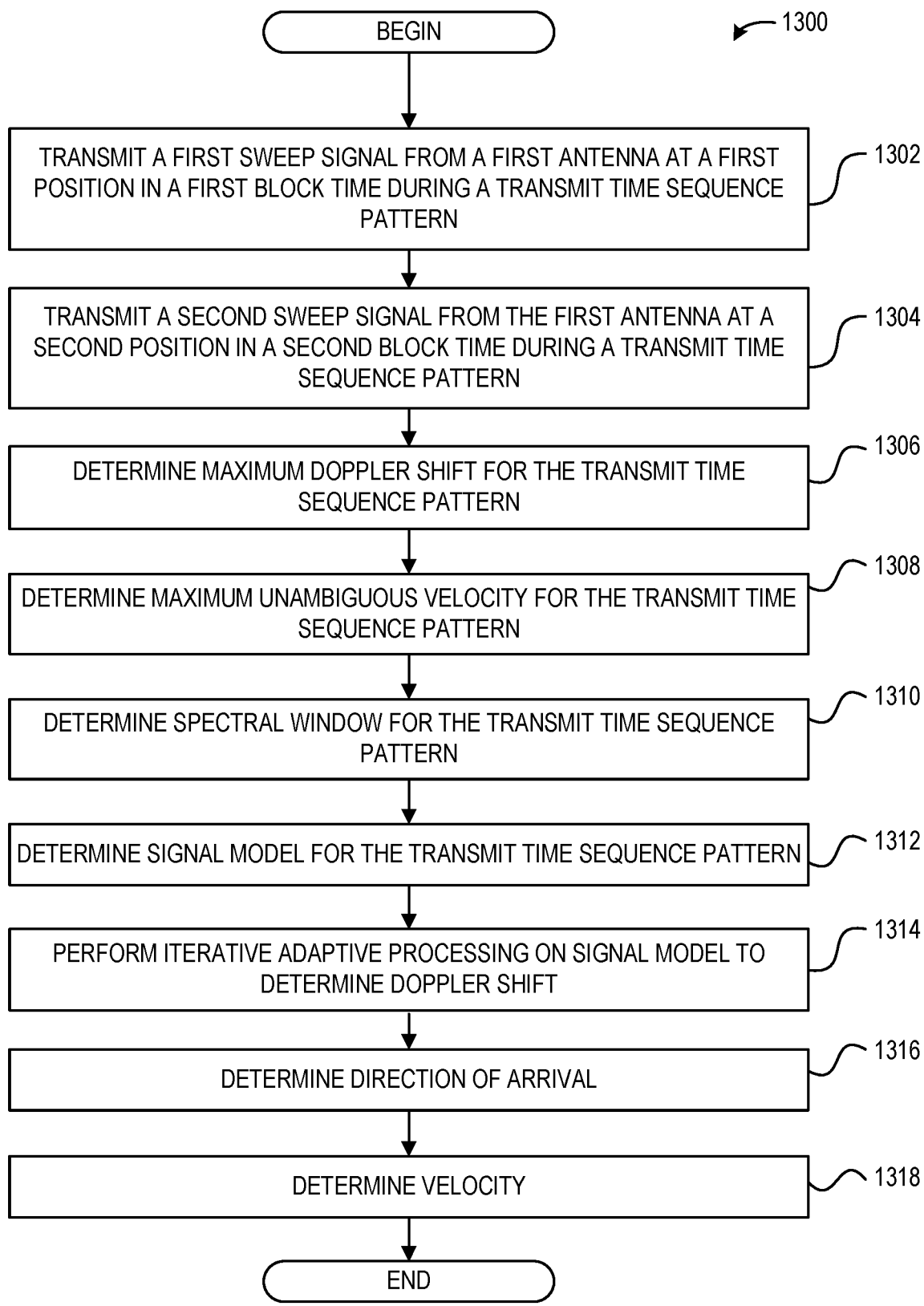
FIG. 13 is a flowchart representative of machine readable instructions which may be executed to implement the example radar system of FIG. 3.

A flowchart representative of example hardware logic, machine readable instructions, hardware implemented state machines, and/or any combination thereof for implementing the radar system 300 of FIG. 3 is shown in FIG. 13. The machine readable instructions may be one or more executable programs or portion(s) of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 13, many other methods of implementing the example radar system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 13 begins at block 1302 where the first transmitter 302 transmits a first sweep signal at a first position in a first block time during a transmit time sequence pattern. For example, the first sweep signal is transmitted at a first position based on Equation 9. At block 1304, the first transmitter 302 transmits a second sweep signal at a second position in a second block time during the transmit time sequence pattern. For example, the second sweep signal is transmitted at a second position based on Equation 9. In some examples, the remaining transmitters transmit sweep signals based on Equation 10 in each N blocks.

At block 1306, the velocity analyzer 314 determines a maximum unambiguous Doppler shift for the transmit time sequence pattern. For example, the velocity analyzer 314 determines the maximum Doppler shift for the transmit time sequence pattern based on a number of blocks and a number of transmit antennas in the transmit time sequence pattern in accordance with Equations 10 and 11.

At block 1308, the velocity analyzer 314 determines a maximum unambiguous velocity for the transmit time sequence pattern. For example, the velocity analyzer determines and/or extends the maximum unambiguous velocity in accordance with Equations 11 and 12.

At block 1310, the velocity analyzer 314 determines a spectral window for the transmit time sequence pattern. For example, the velocity analyzer 314 determines the spectral window for the transmit time sequence pattern based on a number of sweep signals in the transmit time sequence pattern in accordance with Equation 15. In some examples, FIGS. 4-7 illustrate example spectral windows. In some examples, blocks 1306, 1308, and 1310 may be removed from the process 1300. That is, the process 1300 may be performed without the processes of blocks 1306, 1308, and 1310.

At block 1312, the velocity analyzer 314 determines a signal model for the transmit time sequence pattern. For example, the velocity analyzer 314 determines the signal model for the transmit time sequence pattern based on the spectral window in accordance with Equation 16. In some examples, the signal model is a received signal model for the transmit time sequence pattern. For example, the received signal is a reflected signal representation of the transmit time sequence pattern for the modeled target objects (e.g., target objects model illustrated in Table 3, transmit sequence pattern in Table 2 case IV) combined and formulated in Equation 16.

At block 1314, the velocity analyzer 314 performs IAA processing on the signal model to determine Doppler shift. For example, the velocity analyzer 314 performs iterative adaptive processing on the received signal model to determine Doppler spectral components for the target object.

At block 1316, the velocity analyzer 314 determines a velocity. For example, the velocity analyzer 314 determines the velocity based on the Doppler spectral components. In some examples, determining the velocity prior to the direction of arrival mitigates errors in phase and angular estimates.

At block 1318 the DOA analyzer 318 determines direction of arrival. For example, the DOA analyzer 318 determines the direction of arrival based on a phase difference across signals received at receiver antennas, and spacing between the receiver antennas in accordance with Equation 17. The process 1300 continues to operate while a target object is detected. In some example, the process 1300 continues while a vehicle is in operation. In some example, when a vehicle is not in operation (e.g., is off), the process 1300 of FIG. 13 ends.

Figure 14:
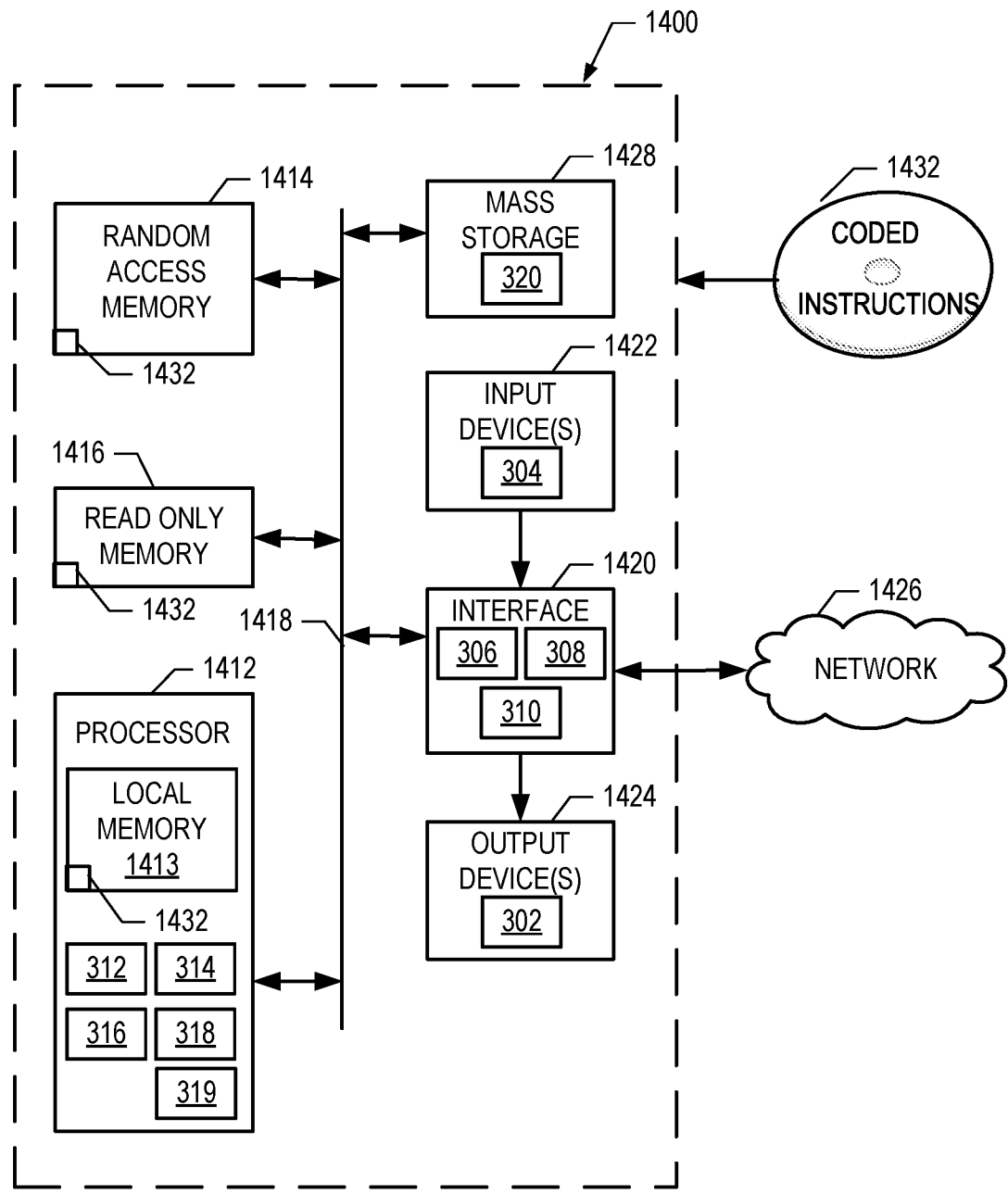
FIG. 14 is a block diagram of an example processing platform structured to execute the instructions on FIG. 13 to implement the example radar system of FIG. 3.

FIG. 14 is a block diagram of an example processor platform 1400 structured to execute the instructions of FIG. 13 to implement the radar system 300 of FIG. 3. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example transmitter signal generator 312, the example velocity analyzer 314, the example range analyzer 316, the example direction of arrival (DOA) analyzer 318, the example visualization generator 319 and/or, more generally, the radar system 300 of FIG. 3.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIG. 13 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus and articles of manufacture have been disclosed that enable MIMO radar transmissions that are much for efficient than radar systems implemented based on conventional TDM or FDM schemes. More particularly, examples disclosed herein utilize a staggered FMCW TDM MIMO waveform that extends the maximum unambiguous Doppler velocity estimation by N-fold where N is the number of transmit antennas, while still preserving the orthogonality in the time required for high-resolution DOA estimation. Examples disclosed herein utilize an Iterative adaptive spectral estimation approach (IAA) to mitigate global leakage in the spectral window. Examples disclosed herein can detect and/or extend maximum unambiguous radial velocities up to 26.6 msec with root mean square error less than 0.01 m/s for SNR values greater than 5 dB as compared to the 2.4 m/sec using a traditional TDM-MIMO waveform. Examples disclosed herein provide a non-uniform sampling in time and non-overlapping transmit antenna sequence that preserves the orthogonality required for the MIMO and AoA processing. Examples disclosed herein increases the functionality of the existing mm-wave FMCW radar sensors to estimate extensive range of Doppler velocities beyond the Nyquist limit within one single TDM-MIMO observation.

The following pertain to further examples disclosed herein.

Further examples and combinations thereof include the following:

Example 1 includes a method comprising causing, by executing an instruction with a processor, transmission of a first sweep signal from a first transmit antenna at a first position in a first block of time during a transmit time sequence pattern, causing, by executing an instruction with the processor, transmission of a second sweep signal from the first transmit antenna at a second position in a second block of time during the transmit time sequence pattern, the second position different than the first position, and determining, by executing an instruction with the processor, a velocity and a direction of arrival of a target object identified during the transmit time sequence pattern.

Example 2 includes the method of example 1, wherein the first position and the second position are non-uniform across the transmit time sequence pattern and non-overlapping within the first block of time and the second block of time in relation to other sweep signals transmitted during the transmit time sequence pattern.

Example 3 includes the method of example 1, further including determining a maximum unambiguous Doppler shift for the transmit time sequence pattern based on a number of blocks and a number of transmit antennas in the transmit time sequence pattern.

Example 4 includes the method of example 3, further including extending a maximum unambiguous Doppler velocity for the transmit time sequence pattern.

Example 5 includes the method of example 4, further including determining a spectral window for the transmit time sequence pattern based on a number of sweep signals in the transmit time sequence pattern.

Example 6 includes the method of example 5, further including determining a signal model for the transmit time sequence pattern based on the spectral window.

Example 7 includes the method of example 6, further including performing iterative adaptive processing on the signal model to determine Doppler spectral components for the target object.

Example 8 includes the method of example 7, further including determining the unambiguous Doppler velocity and the direction of arrival based on the Doppler spectral components.

Example 9 includes an apparatus comprising a transmitter to transmit a first sweep signal from a first transmit antenna at a first position in a first block of time during a transmit time sequence pattern, transmit a second sweep signal from the first transmit antenna at a second position in a second block of time during the transmit time sequence pattern, the second position different than the first position, and a velocity analyzer to determine a velocity and a direction of arrival of a target object identified during the transmit time sequence pattern.

Example 10 includes the apparatus of example 9, wherein the first position and the second position are non-uniform across the transmit time sequence pattern and non-overlapping within the first block of time and the second block of time in relation to other sweep signals transmitted during the transmit time sequence pattern.

Example 11 includes the apparatus of example 9, wherein the velocity analyzer is to determine a maximum unambiguous Doppler shift for the transmit time sequence pattern based on a number of blocks and a number of transmit antennas in the transmit time sequence pattern.

Example 12 includes the apparatus of example 11, wherein the velocity analyzer is to extend a maximum unambiguous Doppler velocity for the transmit time sequence pattern.

Example 13 includes the apparatus of example 12, wherein the velocity analyzer is to determine a spectral window for the transmit time sequence pattern based on a number of sweep signals in the transmit time sequence pattern.

Example 14 includes the apparatus of example 13, wherein the velocity analyzer is to determine a signal model for the transmit time sequence pattern based on the spectral window.

Example 15 includes the apparatus of example 14, wherein the velocity analyzer is to perform iterative adaptive processing on the signal model to determine Doppler spectral components for the target object.

Example 16 includes the apparatus of example 15, wherein the velocity analyzer is to determine the unambiguous Doppler velocity and the direction of arrival based on the Doppler spectral components.

Example 17 includes a non-transitory computer readable medium comprising instructions that, when executed, cause a machine to at least transmit a first sweep signal from a first transmit antenna at a first position in a first block of time during a transmit time sequence pattern, transmit a second sweep signal from the first transmit antenna at a second position in a second block of time during the transmit time sequence pattern, the second position different than the first position, and determine a velocity and a direction of arrival of a target object identified during the transmit time sequence pattern.

Example 18 includes the non-transitory computer readable medium of example 17, wherein the first position and the second position are non-uniform across the transmit time sequence pattern and non-overlapping within the first block of time and the second block of time in relation to other sweep signals transmitted during the transmit time sequence pattern.

Example 19 includes the non-transitory computer readable medium of example 17, wherein the instructions further cause the machine determine a maximum unambiguous Doppler shift for the transmit time sequence pattern based on a number of blocks and a number of transmit antennas in the transmit time sequence pattern.

Example 20 includes the non-transitory computer readable medium of example 19, wherein the instructions further cause the machine to extend a maximum unambiguous Doppler velocity for the transmit time sequence pattern.

Example 21 includes the non-transitory computer readable medium of example 20, wherein the instructions further cause the machine to determine a spectral window for the transmit time sequence pattern based on a number of sweep signals in the transmit time sequence pattern.

Example 22 includes the non-transitory computer readable medium of example 21, wherein the instructions further cause the machine to determine a signal model for the transmit time sequence pattern based on the spectral window.

Example 23 includes the non-transitory computer readable medium of example 22, wherein the instructions further cause the machine to perform iterative adaptive processing on the signal model to determine Doppler spectral components for the target object.

Example 24 includes the non-transitory computer readable medium of example 23, wherein the instructions further cause the machine to determine the unambiguous Doppler velocity and the direction of arrival based on the Doppler spectral components.

Example 25 includes an apparatus comprising means for transmitting to transmit a first sweep signal from a first transmit antenna at a first position in a first block of time during a transmit time sequence pattern, transmit a second sweep signal from the first transmit antenna at a second position in a second block of time during the transmit time sequence pattern, the second position different than the first position, and means for analyzing velocity to determine a velocity and a direction of arrival of a target object identified during the transmit time sequence pattern.

Example 26 includes the apparatus of example 25, wherein the first position and the second position are non-uniform across the transmit time sequence pattern and non-overlapping within the first block of time and the second block of time in relation to other sweep signals transmitted during the transmit time sequence pattern.

Example 27 includes the apparatus of example 25, wherein the velocity analyzing means is to determine a maximum unambiguous Doppler shift for the transmit time sequence pattern based on a number of blocks and a number of transmit antennas in the transmit time sequence pattern.

Example 28 includes the apparatus of example 27, wherein the velocity analyzing means is to extend a maximum unambiguous Doppler velocity for the transmit time sequence pattern.

Example 29 includes the apparatus of example 28, wherein the velocity analyzing means is to determine a spectral window for the transmit time sequence pattern based on a number of sweep signals in the transmit time sequence pattern.

Example 30 includes the apparatus of example 29, wherein the velocity analyzing means is to determine a signal model for the transmit time sequence pattern based on the spectral window.

Example 31 includes the apparatus of example 30, wherein the velocity analyzing means is to perform iterative adaptive processing on the signal model to determine Doppler spectral components for the target object.

Example 32 includes the apparatus of example 31, wherein the velocity analyzing means is to determine the unambiguous Doppler velocity and the direction of arrival based on the Doppler spectral components.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a signal generator to generate a first pattern corresponding to positions of sweep signals for a first block of time of a transmit time sequence pattern;
   a first transmitter to transmit a first sweep signal at a first position within the first block of time during the transmit time sequence pattern based on the first pattern;
   a second transmitter to transmit a second sweep signal at a second position within the first block of time during the transmit time sequence pattern, the second position being different than the first position based on the first pattern;
   the signal generator to generate a second pattern different than the first pattern by adjusting the positions of the sweep signals for a second block of time;
   the first transmitter to transmit a third sweep signal at the second position within the second block of time after the first block of time during the transmit time sequence pattern based on the second pattern; and
   a velocity analyzer to determine a velocity and a direction of arrival of a target object identified during the transmit time sequence pattern based on at least one received signal corresponding to at least one of the first sweep signal, the second sweep signal, or the third sweep signal.

2. The apparatus of claim 1, wherein the first position and the second position are non-uniform across the transmit time sequence pattern and non-overlapping within the first block of time and the second block of time in relation to other sweep signals transmitted during the transmit time sequence pattern.

3. The apparatus of claim 1, wherein the velocity analyzer is to determine a maximum unambiguous Doppler shift for the transmit time sequence pattern based on a number of blocks and a number of transmit antennas in the transmit time sequence pattern.

4. The apparatus of claim 3, wherein the velocity analyzer is to extend a maximum unambiguous Doppler velocity for the transmit time sequence pattern.

5. The apparatus of claim 4, wherein the velocity analyzer is to determine a spectral window for the transmit time sequence pattern based on a number of sweep signals in the transmit time sequence pattern.

6. The apparatus of claim 5, wherein the velocity analyzer is to determine a signal model for the transmit time sequence pattern based on the spectral window.

7. The apparatus of claim 6, wherein the velocity analyzer is to perform iterative adaptive processing on the signal model to determine Doppler spectral components for the target object.

8. The apparatus of claim 7, wherein the velocity analyzer is to determine the maximum unambiguous Doppler velocity and the direction of arrival based on the Doppler spectral components.

9. The apparatus of claim 1, further including a third transmitter to transmit a fourth sweep signal at a third position within the first block of time during the transmit time sequence pattern based on the first pattern, the third position different from the first and second positions.

10. The apparatus of claim 9, wherein the third transmitter is to transmit a fifth sweep signal at the first position within the second block of time during the transmit time sequence pattern based on the second pattern.

11. The apparatus of claim 9, wherein the third transmitter is to transmit a fifth sweep signal at a fourth position different than the third position within the second block of time during the transmit time sequence pattern based on the second pattern.

12. The apparatus of claim 1, wherein the first block of time is adjacent to the second block of time.

13. A non-transitory computer readable medium comprising instructions that, when executed, cause a machine to at least:
   generate a first pattern corresponding to positions of sweep signals for a first block of time of a transmit time sequence pattern;

cause a first antenna to transmit a first sweep signal at a first position within the first block of time during the transmit time sequence pattern based on the first pattern;

cause a second antenna to transmit a second sweep signal at a second position within the first block of time during the transmit time sequence pattern, the second position being different than the first position based on the first pattern;

generate a second pattern different than the first pattern by adjusting the positions of the sweep signals for a second block of time;

cause the first antenna to transmit a third sweep signal at the second position within the second block of time after the first block of time during the transmit time sequence pattern based on the second pattern; and determine a velocity and a direction of arrival of a target object identified during the transmit time sequence pattern based on an obtained signal corresponding to at least one of the first sweep signal, the second sweep signal, or the third sweep signal.

14. The non-transitory computer readable medium of claim 13, wherein the first position and the second position are non-uniform across the transmit time sequence pattern and non-overlapping within the first block of time and the second block of time in relation to other sweep signals transmitted during the transmit time sequence pattern.

15. The non-transitory computer readable medium of claim 13, wherein the instructions further cause the machine to determine a maximum unambiguous Doppler shift for the transmit time sequence pattern based on a number of blocks and a number of transmit antennas in the transmit time sequence pattern.

16. The non-transitory computer readable medium of claim 15, wherein the instructions further cause the machine to extend a maximum unambiguous Doppler velocity for the transmit time sequence pattern.

17. The non-transitory computer readable medium of claim 16, wherein the instructions further cause the machine to determine a spectral window for the transmit time sequence pattern based on a number of sweep signals in the transmit time sequence pattern.

18. The non-transitory computer readable medium of claim 17, wherein the instructions further cause the machine to determine a signal model for the transmit time sequence pattern based on the spectral window.

19. The non-transitory computer readable medium of claim 18, wherein the instructions further cause the machine to perform iterative adaptive processing on the signal model to determine Doppler spectral components for the target object.

20. The non-transitory computer readable medium of claim 19, wherein the instructions further cause the machine to determine the maximum unambiguous Doppler velocity and the direction of arrival based on the Doppler spectral components.

21. A method comprising:
generating, by executing an instruction with a processor, a first pattern corresponding to positions of sweep signals for a first block of time of a transmit time sequence pattern;

causing, by executing an instruction with the processor, transmission of a first sweep signal from a first transmit antenna at a first position within the first block of time during the transmit time sequence pattern based on the first pattern;

causing, by executing an instruction with the processor, transmission of a second sweep signal from a second transmit antenna at a second position within the first block of time during the transmit time sequence pattern, the second position being different than the first position based on the first pattern;

generating, by executing an instruction with the processor, a second pattern different than the first pattern by adjusting the positions of the sweep signals for a second block of time;

causing, by executing an instruction with the processor, transmission of a third sweep signal from the first transmit antenna at the second position within the second block of time different than the first block of time during the transmit time sequence pattern based on the second pattern; and determining, by executing an instruction with the processor, a velocity and a direction of arrival of a target object identified during the transmit time sequence pattern based on at least one of the first sweep signal, the second sweep signal, or the third sweep signal.

22. The method of claim 21, wherein the first position and the second position are non-uniform across the transmit time sequence pattern and non-overlapping within the first block of time and the second block of time in relation to other sweep signals transmitted during the transmit time sequence pattern.

23. The method of claim 21, further including:
determining a maximum unambiguous Doppler shift for the transmit time sequence pattern based on a number of blocks and a number of transmit antennas in the transmit time sequence pattern;

extending a maximum unambiguous Doppler velocity for the transmit time sequence pattern;

determining a spectral window for the transmit time sequence pattern based on a number of sweep signals in the transmit time sequence pattern;

determining a signal model for the transmit time sequence pattern based on the spectral window; and performing iterative adaptive processing on the signal model to determine Doppler spectral components for the target object.

24. The method of claim 23, further including determining the maximum unambiguous Doppler velocity and the direction of arrival based on the Doppler spectral components.

25. An apparatus comprising:
means for generating a first pattern corresponding to positions of sweep signals for a first block of time of a transmit time sequence pattern;

first means for transmitting a first sweep signal from a first transmit antenna at a first position within the first block of time during the transmit time sequence pattern based on the first pattern;

second means for transmitting a second sweep signal from a second transmit antenna at a second position within the first block of time during the transmit time sequence pattern, the second position being different than the first position based on the first pattern;

the means for generating to generate a second pattern different than the first pattern by adjusting the positions of the sweep signals for a second block of time;

the first means for transmitting to transmit a third sweep signal from the first transmit antenna at the second position within the second block of time during the transmit time sequence pattern, the second block of time different than the first block of time based on the second pattern; and means for analyzing velocity to determine a velocity and a direction of arrival of a target object identified during the transmit time sequence pattern based on at least one obtained signal corresponding to at least one of the first sweep signal, the second sweep signal, or the third sweep signal.

\* \* \* \* \*